United States Patent [19]

Sanada et al.

[11] Patent Number: 5,285,371
[45] Date of Patent: * Feb. 8, 1994

[54] POWER CONVERSION APPARATUS

[75] Inventors: Kazunori Sanada; Takao Kawabata, both of Kobe, Japan

[73] Assignee: Mitsubishi Denki Kabushiki Kaisha, Tokyo, Japan

[*] Notice: The portion of the term of this patent subsequent to Oct. 27, 2009 has been disclaimed.

[21] Appl. No.: 849,454

[22] Filed: Mar. 11, 1992

[30] Foreign Application Priority Data

Mar. 13, 1991 [JP] Japan ................................. 3-047194

[51] Int. Cl.$^5$ ............................................. H02M 5/22
[52] U.S. Cl. ...................................... 363/71; 363/159
[58] Field of Search ............................. 363/71, 55-58, 363/39, 159-165, 157, 2, 8, 10, 41, 9, 79, 37, 131, 132, 127, 128, 15, 17

[56] References Cited

U.S. PATENT DOCUMENTS

| | | | |
|---|---|---|---|
| 4,719,550 | 1/1988 | Powell et al. | 307/46 |
| 4,878,163 | 10/1989 | Yamato et al. | 363/8 |
| 5,159,539 | 10/1992 | Koyama | 363/8 |

FOREIGN PATENT DOCUMENTS 0293869 12/1988 European Pat. Off. .
8407667 11/1985 France .

OTHER PUBLICATIONS

"New Conversion System For UPS Using High Frequency Link" IEEE PESC 1988 Record.

*Primary Examiner*—Emanuel T. Voeltz
*Assistant Examiner*—Adolf Berhane
*Attorney, Agent, or Firm*—Leydig, Voit & Mayer

[57] ABSTRACT

A power conversion apparatus includes: a reference signal generating circuit for generating a reference signal which has a first frequency; a first power converter for converting D.C. power into A.C. power which has the first frequency; a transformer connected to the first power converter; a carrier signal generating circuit for generating a carrier signal which has a second frequency which is higher than the first frequency; a second power converter having a plurality of switching devices and as well as converting the output from the transformer into A.C. power which has the second frequency; a command signal generating circuit for generating a command signal for commanding the quantity of the output from the second power converter; and a second-power-converter control circuit for generating a drive signal for driving a plurality of the switching devices of the second power converter in such a manner that the drive signal is generated in response to the reference signal generated by the reference signal generating circuit and a command signal generated by the command signal generating circuit and as well as in synchronization with the carrier signal generated by the carrier signal generating circuit.

11 Claims, 12 Drawing Sheets

POWER CONVERSION APPARATUS

BACKGROUND OF THE INVENTION

1. Field of the Invention

The present invention relates to a power conversion apparatus for use in an uninterruptive power supply apparatus (hereinafter abbreviated to a "UPS"), a fuel cell generating system, an active filter or a VVVF.

2. Description of the Related Art

FIG. 10 is a block diagram which illustrates a power conversion apparatus disclosed in, for example, Japanese Patent Application No. 1-211737. Referring to FIG. 10, reference numeral 1 represents a DC power source, 2 represents an inverter circuit and 3 represents a transformer the input terminal of which is connected to the inverter circuit 2. Reference numeral 4 represents a cyclo converter circuit connected to the output terminal of the transformer 3. Reference numeral 5 represents a filter circuit connected to the output terminal of the cyclo converter circuit 4. Reference numeral 6 represents a load circuit connected to the output terminal of the filter circuit 5. Reference numeral 10 represents a carrier signal generating circuit, 11a represents an inverter control circuit, 12 represents an output voltage command generating circuit for processing a command of an output voltage or an output current transmitted from the cyclo converter 4 and 13a represents a cycle converter control circuit.

FIG. 11 illustrates the detailed structures of the inverter circuit 2, the transformer 3 and the cyclo converter circuit 4. The inverter circuit 2 comprises semiconductor switching devices $S_1$ to $S_4$ composed of transistors, MOSFETs or the like and diodes $D_1$ to $D_4$ which are respectively, in an anti-parallel manner, connected to the corresponding semiconductor switching devices $S_1$ to $S_4$. The transformer 3 has a primary coil which is connected to the inverter circuit 2 and as well has a secondary coil which is connected to the cyclo converter circuit 4. The cyclo converter circuit 4 comprises semiconductor switching devices $S_5$ to $S_8$ and $S_{5A}$ to $S_{8A}$ composed of transistors, MOSFETs or the like and diodes $D_5$ to $D_8$ and $D_{5A}$ to $D_{8A}$ which are respectively, in an anti-parallel manner, connected to the corresponding switching devices $S_5$ to $S_8$ and $S_{5A}$ to $S_{8A}$. The two semiconductor switching devices $S_n$ and $S_{nA}$ (n=5 to 8) and two diodes $D_n$ and $D_{nA}$ (n=5 to 8) connected to the same in the anti-parallel manner constitute a bidirectional switch $Q_n$ which is capable of controlling the power supply direction.

As shown in FIG. 12, the inverter control circuit 11a comprises a ½ divider 100 which transmits an output signal, the polarity of which is inverted in synchronization with the last transition of an input signal, and a NOT circuit 101 connected to the ½ divider 100. The inverter control circuit 11a transmits drive signals $T_1$ to $T_4$ to the inverter circuit 2, the switching signals $T_1$ to $T_4$ being signals for switching on/off the switching devices $S_1$ to $S_4$ of the inverter circuit 2.

FIG. 13 illustrates the detailed structure of the cyclo converter control circuit 13a which comprises an absolute value circuit 102, a comparator 103, NOT circuits 105, 106, 108 and 110, ½ dividing circuits 104 and 107, a polarity discriminating circuit 109, AND circuits 111 to 118 and OR circuits 119 to 122. The cyclo converter control circuit 13a transmits drive signals $T_5$ to $T_8$ which are signals for switching on/off switches $Q_5$ to $Q_8$ of the cyclo converter circuit 4.

Then, the operation of the above-described conventional apparatus will now be described with reference to a timing chart shown in FIG. 14. First, a sawtooth shape carrier signal $V_p$ facing an upper right direction is transmitted from the carrier signal generating circuit 10. Then, drive signals $T_1$ to $T_4$, the duty ratio of each of which is 50%, are, due to the following operations, transmitted from the inverter control circuit 11a shown in FIG. 12: when the carrier signal $V_p$ is supplied, signal Tx, which synchronizes with the signal $V_p$ and which is halved, is transmitted from the ½ divider 100. Furthermore, the NOT circuit 101 transmits signal $T_y$ which is a signal obtainable by inverting the sign of the signal $T_x$. As a result, the signal $T_x$ is, as the drive signals $T_1$ and $T_4$, transmitted to the inverter circuit 2. Furthermore, the signal $T_y$ is, as the drive signals $T_2$ and $T_3$, transmitted to the same. When the level of each of the drive signals $T_1$ to $T_4$ is high, the corresponding switching devices $S_1$ to $S_4$ of the inverter circuit 2 are switched on, while the same are switched off when the above-described level is low. Furthermore, the relationship between the switching on/off operations of the semiconductor switching devices $S_1$ to $S_4$ and the secondary voltage $V_2$ of the transformer 3 shown in FIG. 11 can be expressed as follows:

When the switches $S_1$ and $S_4$ are switched on:
$V_2 = V_{dc}$

When the switches $S_2$ and $S_3$ are switched on:
$$V_2 = -V_{dc} \tag{1}$$

where symbol $V_{dc}$ denotes the output voltage from the DC power source 1

Therefore, the secondary voltage $V_2$ becomes a rectangular wave voltage the duty ratio of which is 50% as shown in FIG. 14.

On the other hand, the output voltage command generating circuit 12 transmits output voltage command signal $V_{cc}^*$ which instructs the output voltage to be transmitted from the cyclo converter 4, the output voltage command signal $V_{cc}^*$ being, together with the carrier signal $V_p$, supplied to the cyclo converter control circuit 13a. The cyclo converter control circuit 13a receives the above-described signals so as to transmit the drive signals $T_5$ to $T_8$ the pulse width of each which has been modulated as follows. Referring to FIG. 13, the output voltage command signal $V_{cc}^*$ is converted into absolute signal $|V_{cc}^*|$ by the absolute value circuit 102. The absolute signal $|V_{cc}^*|$ is, together with the carrier signal $V_p$, supplied to the comparator 103. The comparator 103 transmits signal $T_p$ shown in FIG. 14, the signal $T_p$ being then supplied to the ½ divider 104 in which the signal $T_p$ is converted into signal $T_a$. On the other hand, when the signal $T_p$ is supplied to the ½ divider 107 after the sign of it has been inverted by the NOT circuit 106, signal $T_b$ formed into the same wave shape as that of the signal $T_x$ is transmitted. Furthermore, when the signal $T_a$ is supplied to the NOT circuit 105, signal $T_c$ is transmitted, while when the signal $T_b$ is supplied to the NOT circuit 108, signal $T_d$ formed into the same wave shape as that of the signal $T_y$ is transmitted.

Then, the relationship between the signals $T_a$ to $T_d$ and output voltage $V_{cc}$ from the cycle converter circuit 4 will now be described. In a case where there is a desire to make the polarity of the output voltage $V_{cc}$ to be positive, the drive signals $T_5$ to $T_8$ are determined in accordance with the following equations:

$$T_5=T_a, T_6=T_d, T_7=T_c, T_8=T_b \quad (2)$$

In response to the above-described drive signals $T_5$ to $T_8$, the switch $Q_n$ (n=5 to 8) which constitutes the bidirectional switch is switched on/off. As a result, the output voltage $V_{cc}$ from the cyclo converter circuit 4 is controlled. The fact that the switch $Q_n$ is switched on/off means a fact that the switching devices $S_n$ and $S_{nA}$ are simultaneously switched on/off. The relationship between the switching on/off operation performed by the switch $Q_n$ (n=5 to 8) and the above-described output voltage $V_{cc}$ is expressed by the following equations:

When switches $Q_5$ and $Q_8$ are switched on: $V_{cc}=V_2$

When switches $Q_6$ and $Q_7$ are switched on: $V_{cc}=-V_2$

When switches $Q_5$ and $Q_6$ are switched on: $V_{cc}=0$ \quad (3)

When switches $Q_7$ and $Q_8$ are switched on: $V_{cc}=0$

Therefore, the following facts can be deduced from Equations (2) and (3): when the levels of each of the signals $T_a$ and $T_b$ is high in FIG. 14, the relationship $V_{cc}=V_2$ is held, when the levels of each of the signals $T_c$ and $T_d$ is high, the relationship $V_{cc}=-V_2$ is held. When the levels of each of the signals $T_a$ and $T_d$ or the signals $T_b$ and $T_c$ are high, the relationship $V_{cc}=0$ is held. Therefore, the output voltage $V_{cc}$ from the cyclo converter circuit 4, as shown in FIG. 14, becomes positive voltage the pulse width of which has been modulated. In a case where there is a desire to make the polarity of the output voltage $V_{cc}$ to be negative, the drive signals $T_5$ to $T_8$ may be determined in accordance with the following equations:

$$T_5=T_c, T_6=T_b, T_7=T_a, T_8=T_d \quad (4)$$

Then, the description about the operation shown in FIG. 13 will now be continued. The polarity discriminating circuit 109 transmits polarity signal $V_{sgn}$ denoting the polarity of the output voltage command signal $V_{cc}^*$. The NOT circuit 110 transmits a signal which is a signal obtainable by inverting the sign of the polarity signal $V_{sgn}$. The above-described signals and the signals $T_a$ to $T_d$ are, via the AND circuits 111 to 118, supplied to the OR circuits 119 to 122. When the polarity of the output voltage command signal $V_{cc}^*$ is positive, the signals $T_a$, $T_c$, $T_d$ and $T_b$ are transmitted from the AND circuits 111, 114, 116 and 117, respectively. Therefore, the drive signals $T_5$ to $T_8$ in accordance with Equation (2) are transmitted to the switches $Q_5$ to $Q_8$ of the cyclo converter circuit 4. Similarly, when the polarity of the output voltage command signal $V_{cc}^*$ is negative, the drive signals $T_5$ to $T_8$ in accordance with Equation (4) are transmitted to the switches $Q_5$ to $Q_8$. As a result of the above-described operations, the voltage $V_{cc}$, the wave form of which is obtainable by modulating the pulse width of the AC output voltage command signal $V_{cc}^*$ transmitted from the output voltage command generating circuit 12, is transmitted from the cyclo converter circuit 4. In this state, the PWM operation can be performed similarly by a method arranged in such a manner that the output current transmitted from the cyclo converter circuit 4 is detected and the switch $Q_n$ (n=5 to 8) of the cyclo converter circuit 4 is switched in a single direction in accordance with the polarity of the output current as follows:

when the polarity of the electric current is positive:

$$S_5=T_5, S_6=T_6, S_7=T_7, S_8=T_8 \quad (5)$$

All of switches $S_{5A}$ to $S_{8A}$ are switched off
When the polarity of the electric current is negative:
All of switches $S_5$ to $S_8$ are switched off $$S_{5A}=T_5, S_{6A}=T_6, S_{7A}=T_7, S_{8A}=T_8 \quad (6)$$

Furthermore, the output from the cyclo converter circuit 4 is supplied to the load circuit 6 after the high frequency component of the output voltage $V_{cc}$ has been removed by the filter circuit 5.

The conventional power conversion apparatus has been constituted as described above in such a manner that it receives the DC power and temporarily converts it into a high frequency AC so as to transmit AC power which corresponds to the output voltage command signal by using the high frequency AC power. Since high frequency electric power is transmitted/received via a transformer in a DC-AC power conversion apparatus of the type described above, it is usually called a "high frequency intermediate link type power conversion apparatus". Furthermore, the frequency of the electric power which is caused to pass through the transformer as described above is called a "link frequency". By employing the above-described high frequency intermediate link method, the frequency of the electric power which passes through the insulating transformer can be raised to a level which is several tens of times of the output frequency. Therefore, the size and the weight of the transformer can be reduced. However, in a case where the above-described method is employed in a large-capacity power conversion apparatus, the link frequency must, in fact, be lowered in inverse proportion to the capacity in order to overcome a problem in that it is very difficult to construct both a high frequency and large capacity transformer. The conventional structure constituted as shown in FIG. 10 is arranged in such a manner that the link frequency and the PWM frequency is made to be 1:2. Therefore, the conventional structure encounters a problem in that the PWM frequency of the cyclo converter is lowered in proportion to the link frequency and thereby the controllability of the output voltage waveform of the power converter deteriorates and as well as the size of the filter circuit cannot be reduced.

SUMMARY OF THE INVENTION

An object of the present invention is to provide a power conversion apparatus capable of overcoming the above-described conventional problems, preventing deterioration in the controllability of the output voltage waveform and eliminating a necessity of using a large-size filter circuit.

A power conversion apparatus according to the present invention comprises: a reference signal generating circuit for generating a reference signal which has a first frequency; a first power converter for converting D.C. power into A.C. power which has the first frequency; a transformer connected to the first power converter; a carrier signal generating circuit for generating a carrier signal which has a second frequency which is higher than the first frequency; a second power converter having a plurality of switching means, the second power converter being operated at the converting the output from the transformer into A.C. power which has the second frequency; a command signal generating circuit for generating a command signal for commanding the quantity of the output from the second power converter; and a second-power-converter control circuit for generating a drive signal for driving a plurality of the switching means of the second power converter in such a manner that the drive signal is generated in response to the reference signal generated by the reference signal generating circuit and a command signal generated by the command signal generating circuit and as well as in synchronization with the carrier signal generated by the carrier signal generating circuit.

DESCRIPTION OF THE PREFERRED EMBODIMENTS

Preferred embodiments of the present invention will now be described with reference to the drawings.

Figure 1:
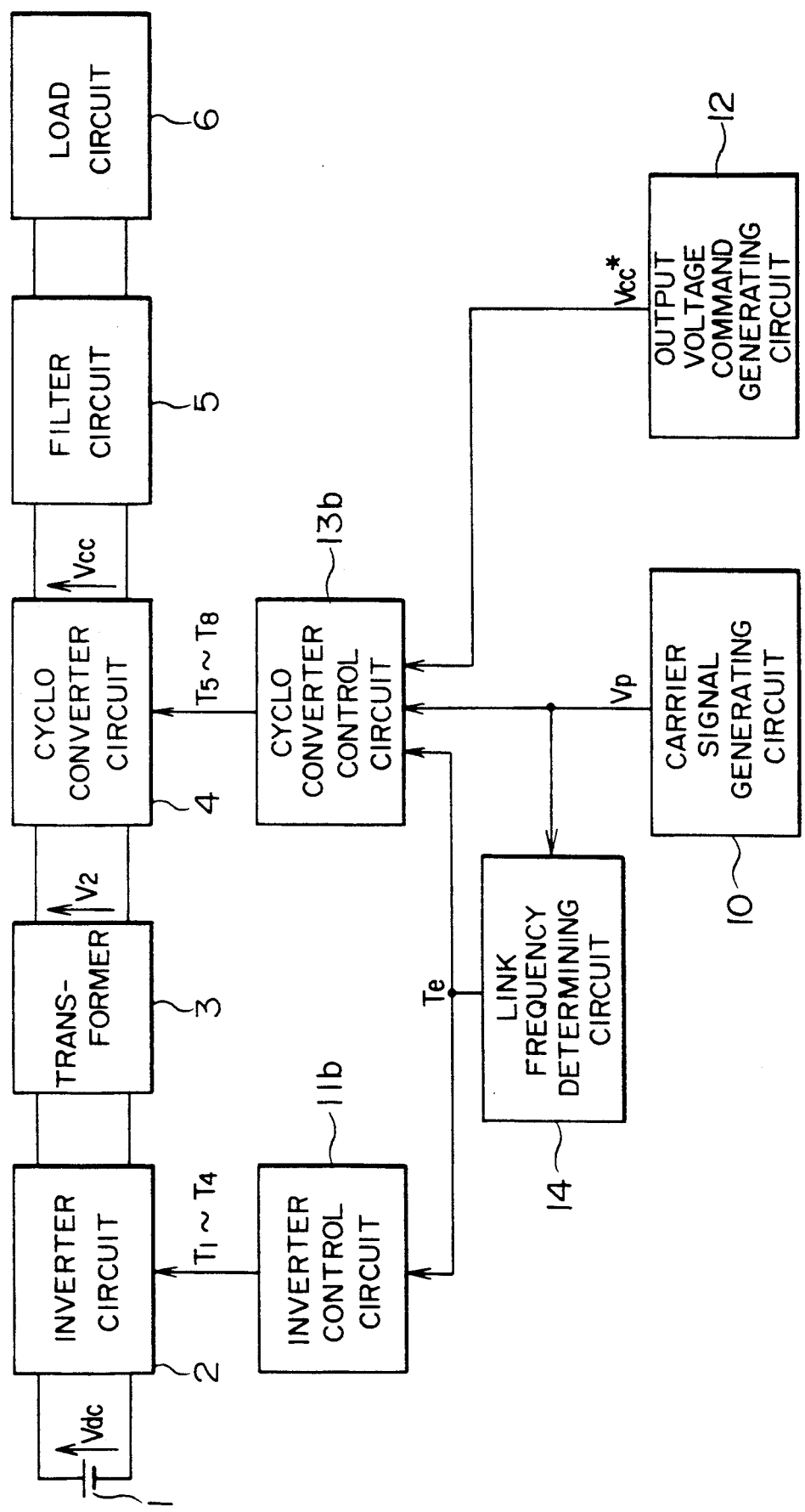
FIG. 1 is a block diagram which illustrates a first embodiment of a power conversion apparatus according to the present invention.
Figure 10:
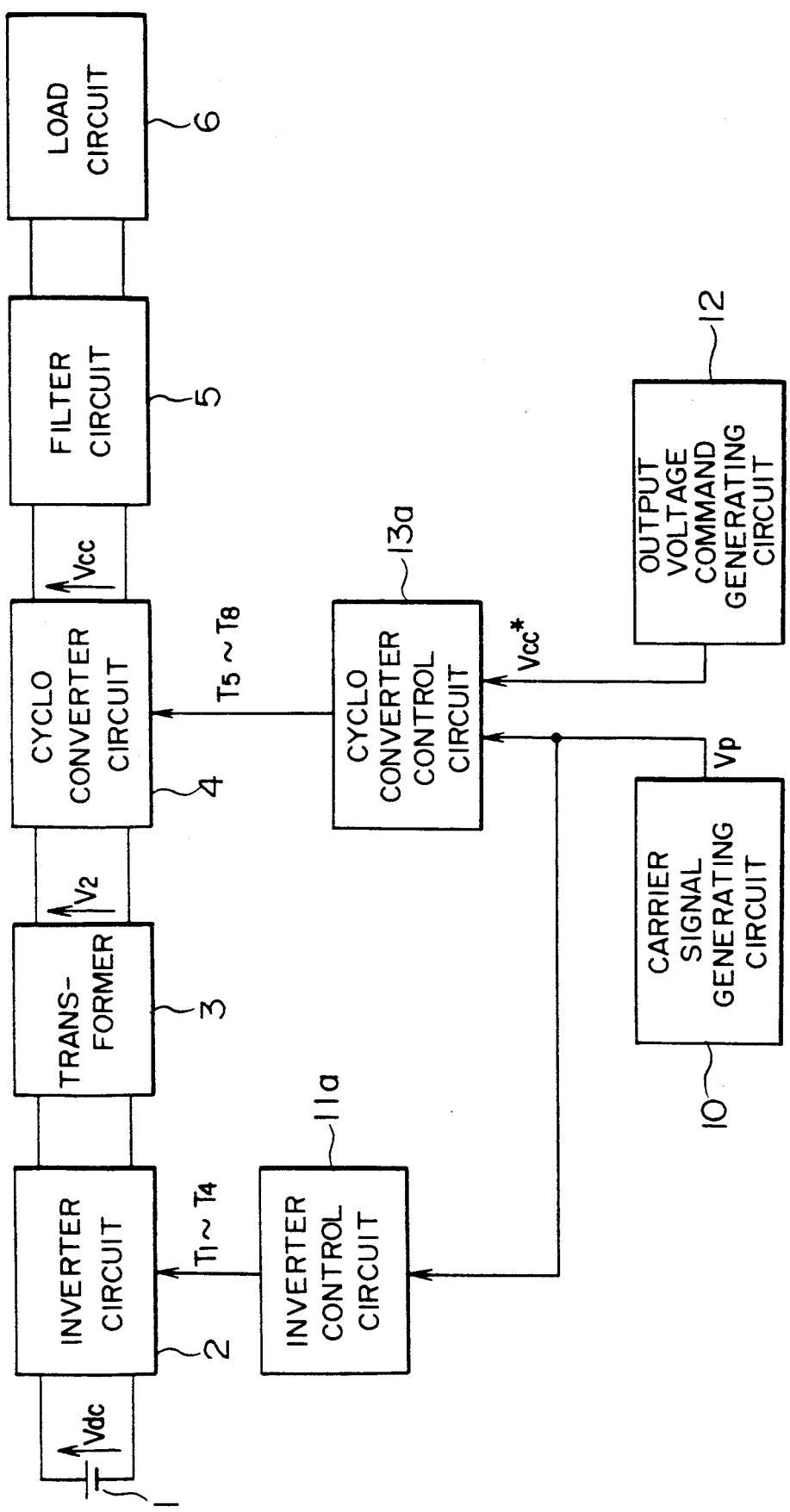
FIG. 10 is a block diagram which illustrates a conventional power conversion apparatus.
Figure 12:
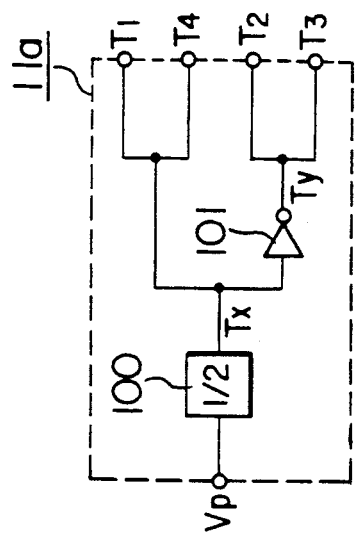
FIG. 12 is a block diagram which illustrates an inverter control circuit according to the conventional structure.

As shown in FIG. 1, a power conversion apparatus according to a first embodiment of the present invention is constituted in such a manner that the inverter control circuit 11a and the cyclo converter control circuit 13a of the conventional power conversion apparatus shown in FIG. 10 are respectively replaced by an inverter control circuit 11b and a cyclo converter control circuit 13b. Furthermore, a link frequency determining circuit 14 is disposed between the carrier signal generating circuit 10 and the inverter control circuit 11b. The link frequency determining circuit 14 divides the carrier signal $V_p$ generated by the carrier signal generating circuit 10 to transmit obtained signal $T_e$ to the inverter control circuit 11b and the cyclo converter control circuit 13b.

Figure 2:
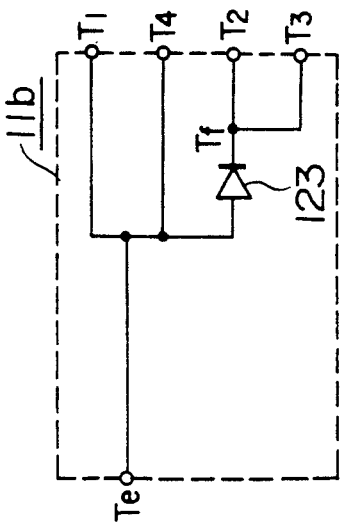
FIG. 2 is a circuit diagram which illustrates an inverter control circuit according to the first embodiment.

As shown in FIG. 2, the inverter control circuit 11b has a NOT circuit 123 for inverting the signal $T_e$ transmitted from the link frequency determining circuit 14 so as to transmit switch signals $T_1$ to $T_4$ to the inverter circuit 2.

Figure 3:
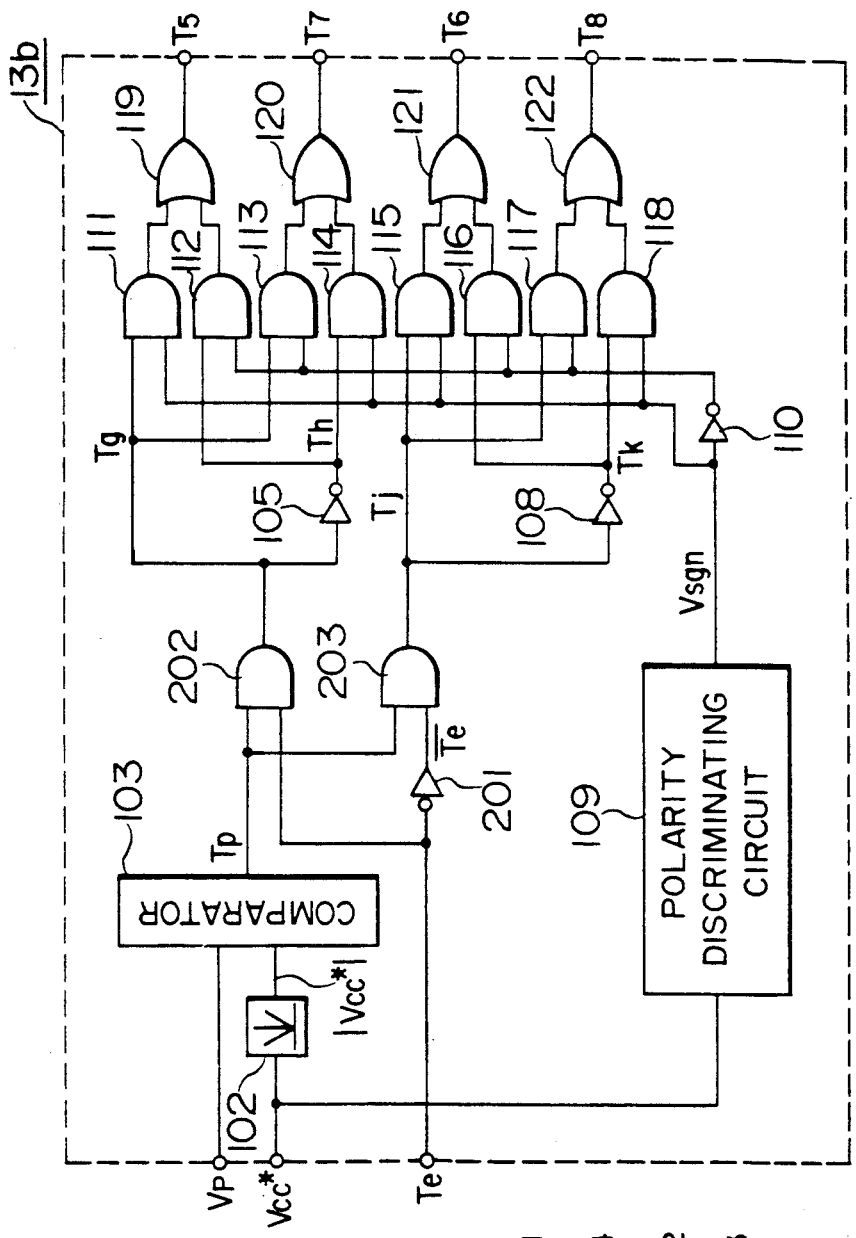
FIG. 3 is a block diagram which illustrates a cyclo converter control circuit according to the first embodiment.

As shown in FIG. 3, the cyclo converter control circuit 13b comprises an absolute value circuit 102, a comparator 103, NOT circuits 105, 108, 110 and 201, a polarity discriminating circuit 109, AND circuits 111 to 118, 202 and 203 and OR circuits 119 to 122, the cyclo converter control circuit 13b thus-constituted transmitting drive signals $T_5$ to $T_8$. The above-described drive signals $T_5$ to $T_8$ are supplied to corresponding switches $Q_5$ to $Q_8$ of the cyclo converter circuit 4.

Figure 4:
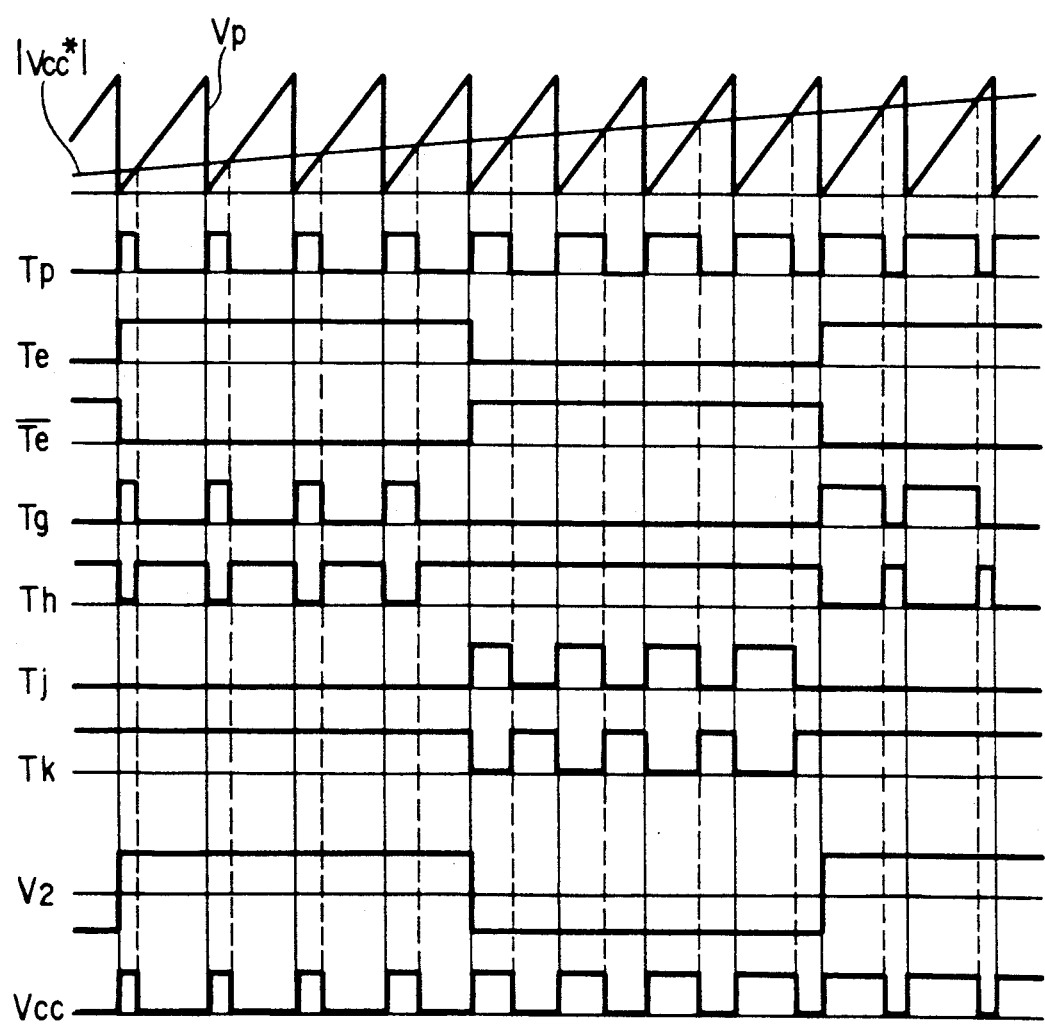
FIG. 4 is a timing chart which illustrates the operation to be performed according to the first embodiment.
Figure 11:
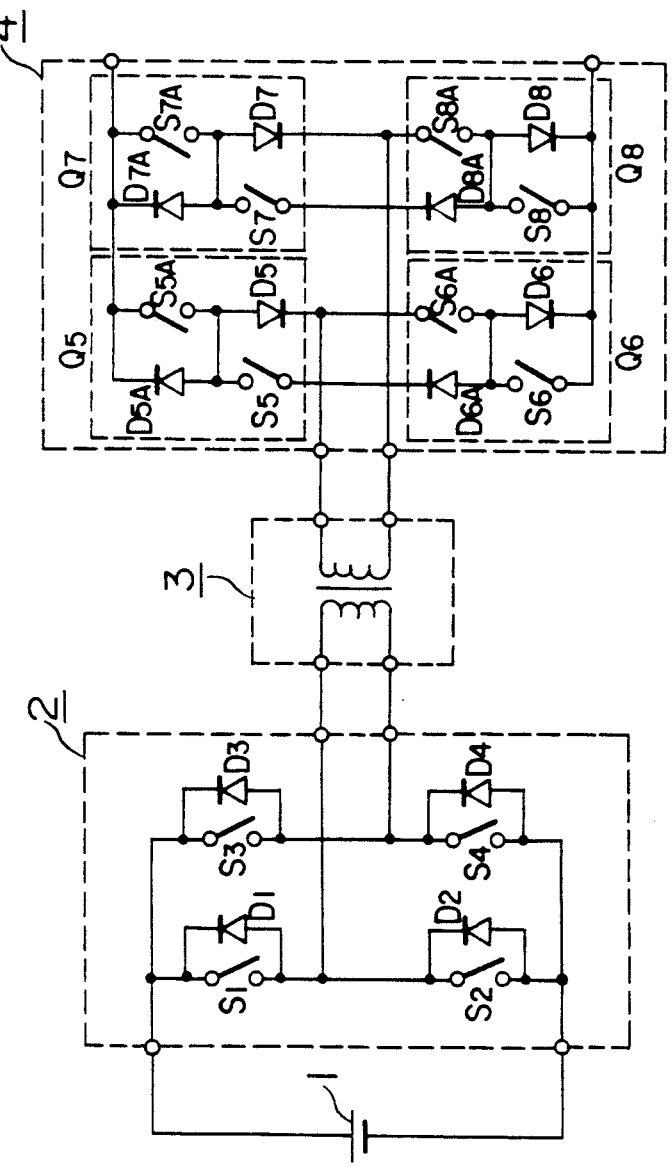
FIG. 11 is a circuit diagram which illustrates an inverter circuit, a transformer and a cyclo converter circuit according to the conventional structure.
Figure 13:
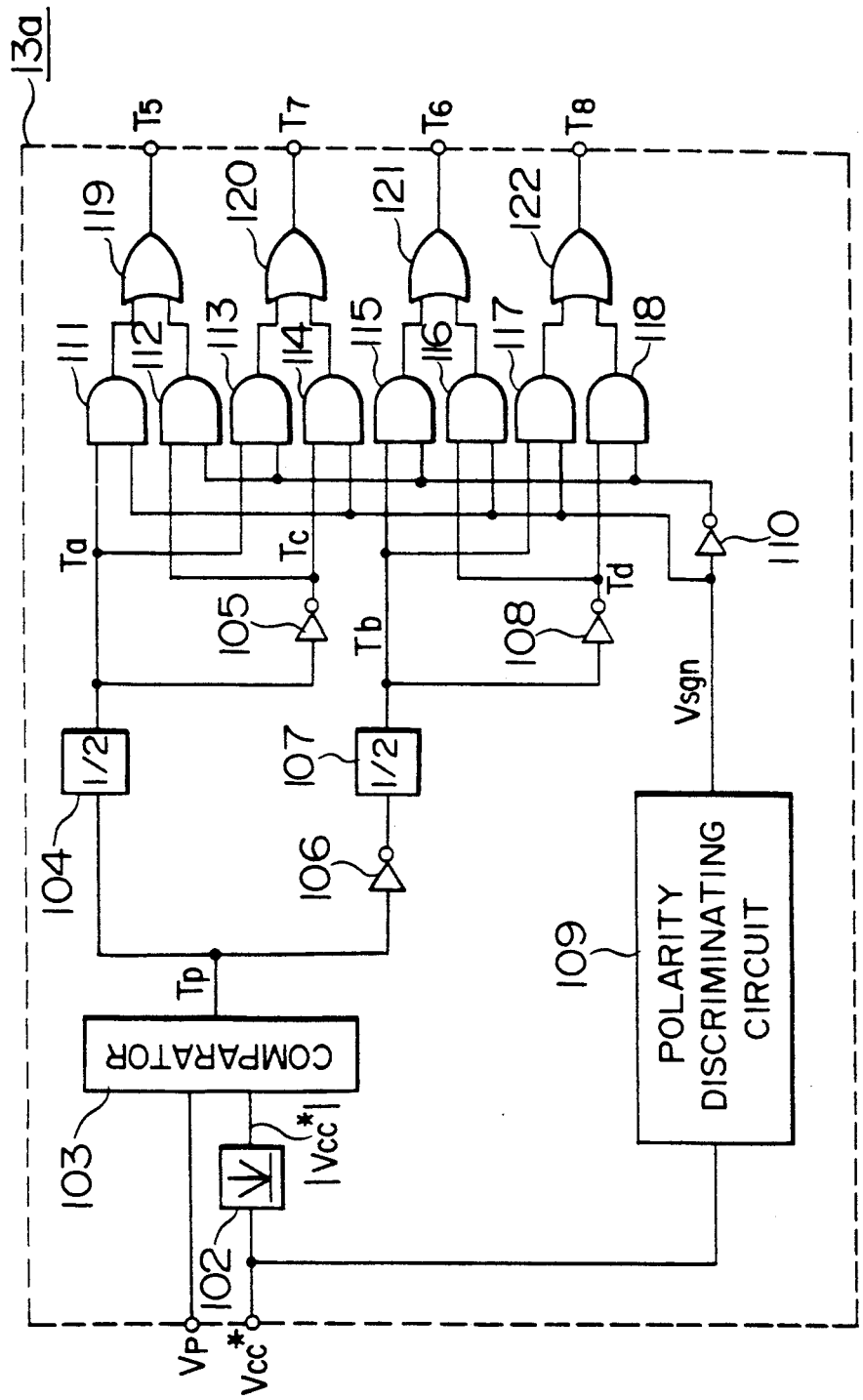
FIG. 13 is a block diagram which illustrates a cyclo converter control circuit according to the conventional structure.
Figure 14:
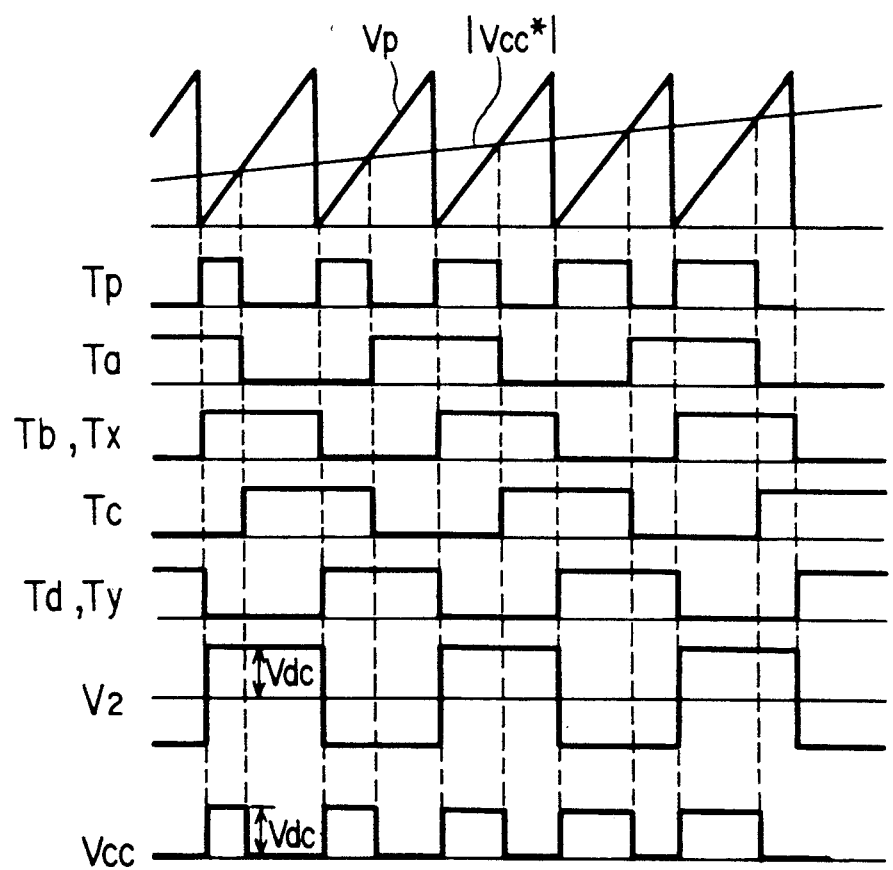
FIG. 14 is a timing chart which illustrates the operation to be performed according to the conventional structure.

Then, the operation of the first embodiment will now be described with reference to a timing chart shown in FIG. 4. First, a sawtooth shape carrier signal $V_p$ facing an upper right direction is transmitted from the carrier signal generating circuit 10 to the link frequency determining circuit 14 and the cyclo converter control circuit 13b. Then, the above-described carrier signal $V_p$ is divided to 1/n by the link frequency determining circuit 14. FIG. 4 illustrates a case where the same is quartered. Therefore, the description will, with reference to FIG. 4, be made about a case in which the PWM frequency is four times the link frequency. In synchronization with the last transition of the carrier signal $V_p$, the quartered signal $T_e$ is transmitted from the above-described link frequency determining circuit 14. Then, inverted signal $T_f$ of the signal $T_e$ is processed by the NOT circuit 123 of the inverter control circuit 11b. As a result, the signal $T_e$ is, as the drive signals $T_1$ and $T_4$, transmitted to the inverter circuit 2, while the signal $T_f$ is, as the drive signals $T_2$ and $T_3$, transmitted to the inverter circuit 2. When the level of each of the drive signals $T_1$ to $T_4$ is high, the corresponding switching devices $S_1$ to $S_4$ of the inverter circuit 2 are switched on. When the same is low, the above-described switching devices $S_1$ to $S_4$ are switched off. The following relationship between the switching on/off operation of the semiconductor switching devices $S_1$ to $S_4$ and the secondary voltage $V_2$ of the transformer 3 is deduced from FIG. 11:

When $S_1$ and $S_4$ are switched on: $V_2 = V_{dc}$

When $S_2$ and $S_3$ are switched on: $V_2 = -V_{dc}$     (7)

where symbol $V_{dc}$ denotes the output voltage from the DC power source 1.

Therefore, the secondary voltage $V_2$ becomes a rectangular wave voltage the duty ratio of which is 50% and the frequency of which is ¼ times that of the carrier signal $V_p$ as shown in FIG. 4.

On the other hand, the output voltage command generating circuit 12 transmits output voltage command signal $V_{cc}^*$ which instructs the output voltage to be transmitted from the cyclo converter circuit 4 for the purpose of controlling the electric current or the voltage of the load circuit 6, the output voltage command signal $V_{cc}^*$ being, together with the carrier signal $V_p$ and the signal $T_e$ transmitted from the link frequency determining circuit 14, supplied to the cyclo converter control circuit 13b. The cyclo converter control circuit 13b receives the above-described signals so as to transmit the drive signals $T_5$ to $T_8$ the pulse width of each which has been modulated as follows. Referring to FIG. 3, the output voltage command signal $V_{cc}^*$ is, first, converted into absolute signal $|V_{cc}^*|$ by the absolute value circuit 102. The absolute signal $|V_{cc}^*|$ is, together with the carrier signal $V_p$, supplied to the comparator 103. The comparator 103 transmits signal $T_p$ shown in FIG. 4. The signal $T_e$ transmitted from the link frequency determining circuit 14 is inverted by the NOT circuit 201 so that it is formed into signal $T_{\bar{e}}$. The signal $T_p$ is subjected to a process in which the AND from the signal $T_e$ is calculated so as to be converted into signal $T_g$. On the other hand, the signal $T_p$ is subjected to a process in which the AND from the signal $T_{\bar{e}}$ is calculated so as to be converted into signal $T_j$. That is, the signal $T_p$ is distributed into the signal $T_g$ and $T_j$ in accordance with the level of the signal $T_e$. Furthermore, the signal $T_g$ is inverted by the NOT circuit 105 so that it is converted into signal $T_h$. The signal $T_j$ is inverted by the NOT circuit 108 so that it is converted into signal $T_k$.

Then, the relationship between the signals $T_g$, $T_h$, $T_j$ and $T_k$ and output voltage $V_{cc}$ from the cycle converter circuit 4 will now be described. In a case where there is a desire to make the polarity of the output voltage $V_{cc}$ to be positive, the drive signals $T_5$ to $T_8$ are determined in accordance with the following equations:

$$T_5 = T_g,\ T_6 = T_j,\ T_7 = T_h,\ T_8 = T_k \qquad (8)$$

In response to the above-described drive signals $T_5$ to $T_8$, the switch $Q_n$ (n=5 to 8) which constitutes the bidirectional switch is switched on/off. As a result, the output voltage $V_{cc}$ from the cyclo converter circuit 4 is controlled. The relationship between the switching on/off operation performed by the switch $Q_n$ (n=5 to 8) and the above-described output voltage $V_{cc}$ is expressed by the following equations:

When switches $Q_5$ and $Q_8$ are switched on: $V_{cc} = V_2$

When switches $Q_6$ and $Q_7$ are switched on:
$V_{cc} = -V_2$

When switches $Q_5$ and $Q_6$ are switched on: $V_{cc} = 0$ \qquad (9)

When switches $Q_7$ and $Q_8$ are switched on: $V_{cc} = 0$

Therefore, the following facts can be deduced from Equations (8) and (9): when the levels of each of the signals $T_g$ and $T_k$ is high in FIG. 4, the relationship $V_{cc} = V_2$ is held, when the levels of each of the signals $T_h$ and $T_j$ is high, the relationship $V_{cc} = -V_2$ is held. When the levels of each of the signals $T_g$ and $T_j$ or the signals $T_h$ and $T_k$ are high, the relationship $V_{cc} = 0$ is held. Therefore, the output voltage $V_{cc}$ from the cyclo converter circuit 4, as shown in FIG. 4, becomes positive voltage the pulse width of which has been modulated. In a case where there is a desire to make the polarity of the output voltage $V_{cc}$ to be negative, the drive signals $T_5$ to $T_8$ may be determined in accordance with the following equations:

$$T_5 = T_h,\ T_6 = T_k,\ T_7 = T_g,\ T_8 = T_j \qquad (10)$$

Then, the description about the operation shown in FIG. 3 will now be continued. The polarity discriminating circuit 109 transmits polarity signal $V_{sgn}$ denoting the polarity of the output voltage command signal $V_{cc}^*$. The NOT circuit 110 transmits a signal which is a signal obtainable by inverting the sign of the polarity signal $V_{sgn}$. The above-described signals and the signals $T_g$, $T_h$, $T_j$ and $T_k$ are, via the AND circuits 111 to 118, supplied to the OR circuits 119 to 122. When the polarity of the output voltage command signal $V_{cc}^*$ is positive, the signals $T_g$, $T_h$, $T_j$ and $T_k$ are transmitted from the AND circuits 111, 114, 115 and 117, respectively. Therefore, the drive signals in accordance with Equation (8) are transmitted to the switches $Q_5$ to $Q_8$ of the cyclo converter circuit 4. Similarly, when the polarity of the reference voltage $V_{cc}^*$ is negative, the drive signals in accordance with Equation (10) are transmitted to the switches $Q_5$ to $Q_8$.

As a result of the above-described operations, the voltage $V_{cc}$, wave form is obtainable by, modulating the pulse width of the output voltage command signal $V_{cc}^*$ with a frequency four times the link frequency. Therefore, it can be understood that the waveform, the pulse width of which is modulated by a frequency which is n times that of the link frequency, is transmitted from the cyclo converter circuit 4 by dividing the carrier signal by n in the link frequency generating circuit 14. In this state, the PWM operation can be performed similarly by a method arranged in such a manner that the output current transmitted from the cyclo converter circuit 4 is detected and the switch $Q_n$ (n=5 to 8) of the cyclo converter circuit 4 is switched in a single direction in accordance with the polarity of the output current as follows:

when the polarity of the electric current is positive:

$$S_5 = T_5,\ S_6 = T_6,\ S_7 = T_7,\ S_8 = T_8 \qquad (11)$$

All of switches $S_{5A}$ to $S_{8A}$ are switched off
When the polarity of the electric current is negative:
All of switches $S_5$ to $S_8$ are switched off $$S_{5A} = T_5,\ S_{6A} = T_6,\ S_{7A} = T_7,\ S_{8A} = T_8 \qquad (12)$$

Furthermore, the output from the cyclo converter circuit 4 is supplied to the load circuit 6 after the high frequency component of the output voltage $V_{cc}$ has been removed by the filter circuit 5.

Figure 5:
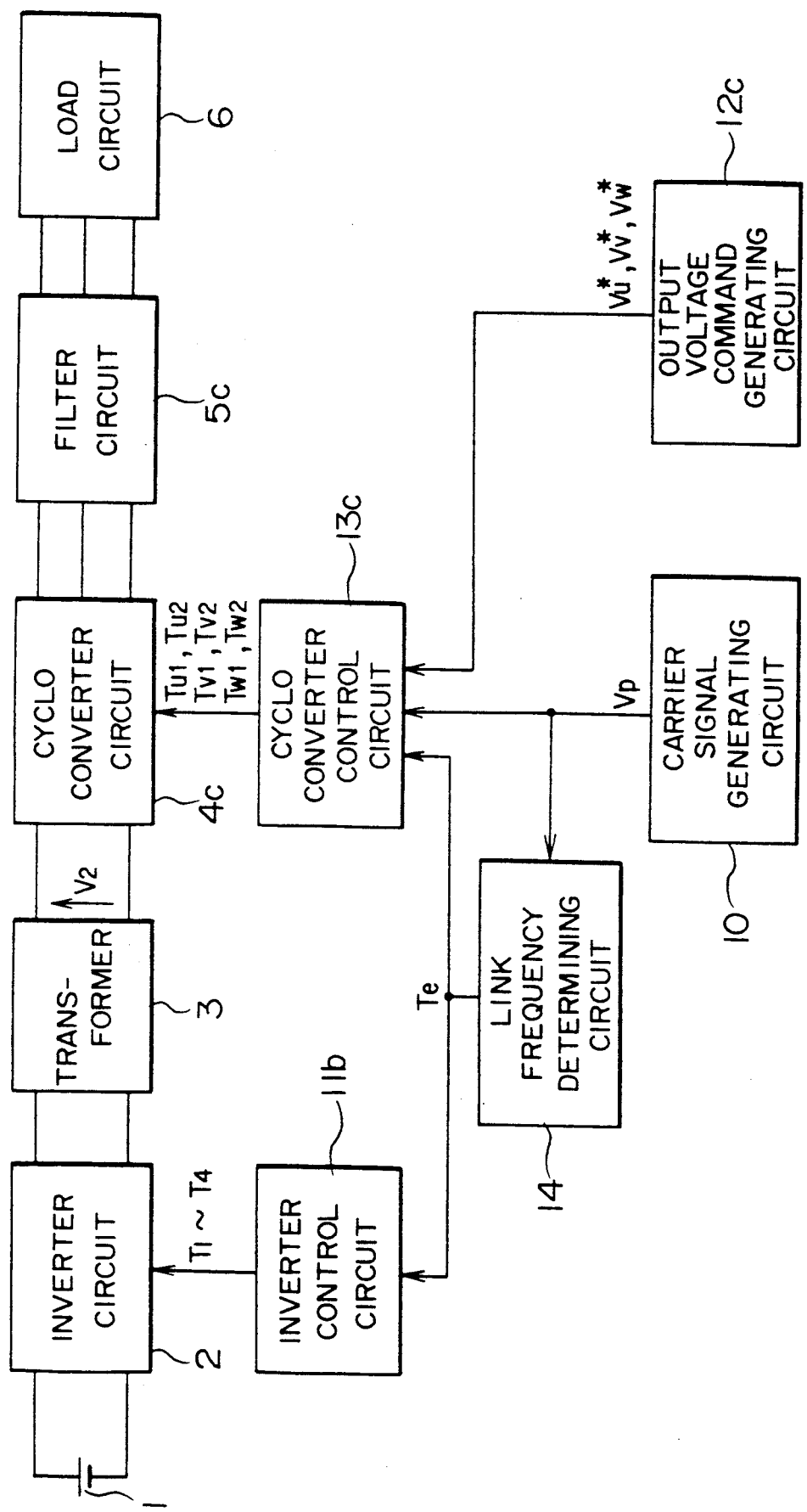
FIG. 5 is a block diagram which illustrates a second embodiment of the power conversion apparatus according the present invention.

Then, a second embodiment of the present invention will now be described with reference to FIGS. 5 to 8. FIG. 5 is a block diagram which illustrates a second embodiment of the present invention. The second embodiment of the present invention is constituted similarly to the first embodiment except for a structure arranged in such a manner that the cyclo converter circuit 4c, the filter circuit 5c, the output voltage command generating circuit 12c and the cyclo converter control circuit 13c are respectively made to be three-phase circuits.

Figure 6:
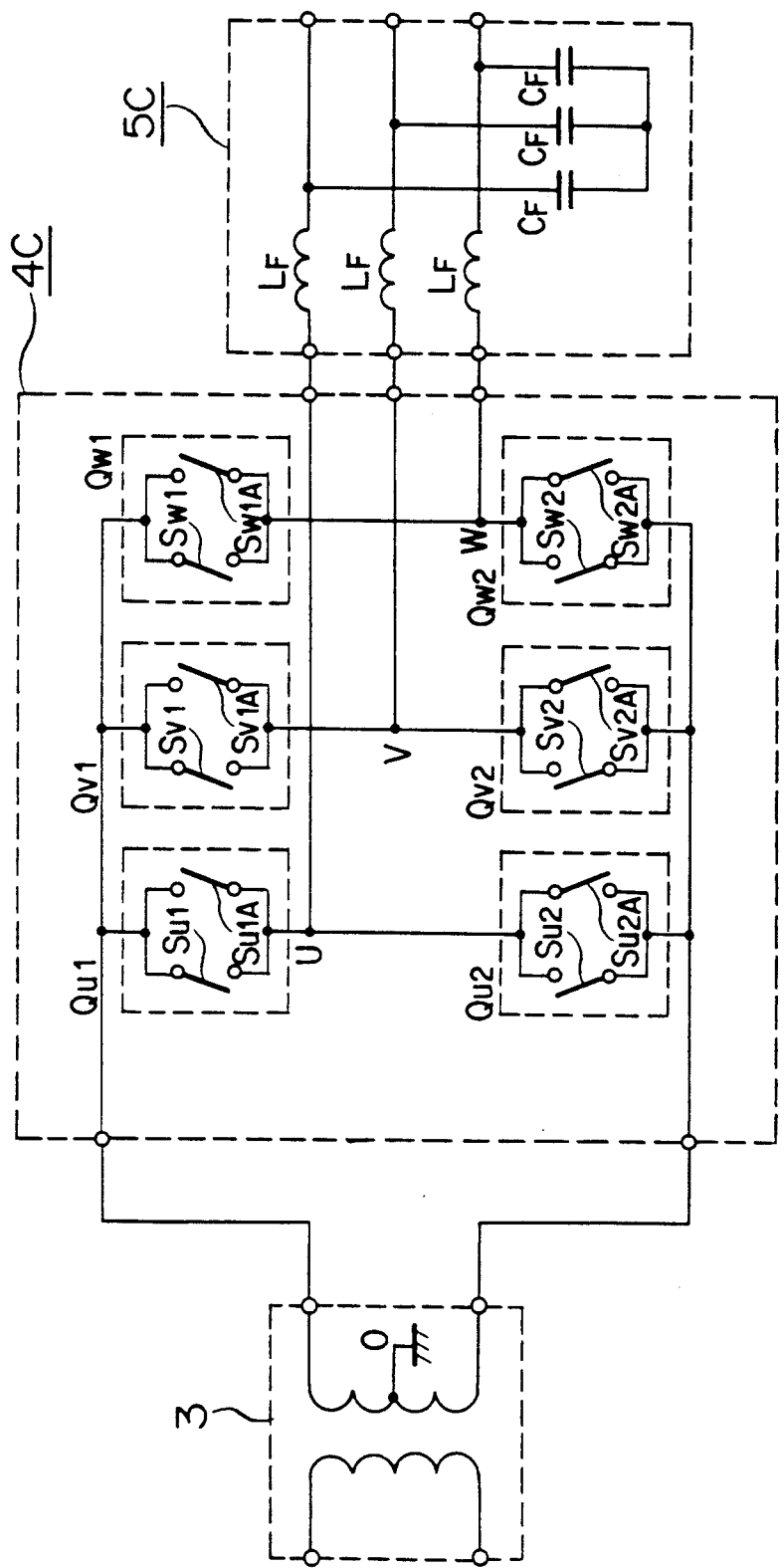
FIG. 6 is a circuit diagram which illustrates a transformer, a cyclo converter circuit and a filter circuit according to a second embodiment.

FIG. 6 illustrates the detailed structure of the transformer 3, the cycle converter circuit 4c and the filter circuit 5c. The cyclo converter circuit 4c comprises semiconductor switching devices such as transistors or MOSFETs as follows in order to transmit three-phase voltage. A U-phase circuit is composed of semiconductor switching devices $S_{u1}$, $S_{u2}$, $S_{u1A}$ and $S_{u2A}$. A pair composed of the switching devices $S_{Su1}$ and $S_{u1A}$ another pair composed of the switching devices $S_{u2}$ and $S_{u2A}$ respectively constitute bidirectional switches $Q_{un}$ (n=1 to 2) with which the power supply direction can be controlled. Also V and W phase circuits are respectively composed of switches $Q_{vn}$ and $Q_{wn}$ with which the bidirectional control can be performed. The filter circuit 5c which receives the output from the cyclo converter circuit 4c is composed of three AC reactors $L_F$ and three capacitors $C_r$ to form an AC filter.

Figure 7:
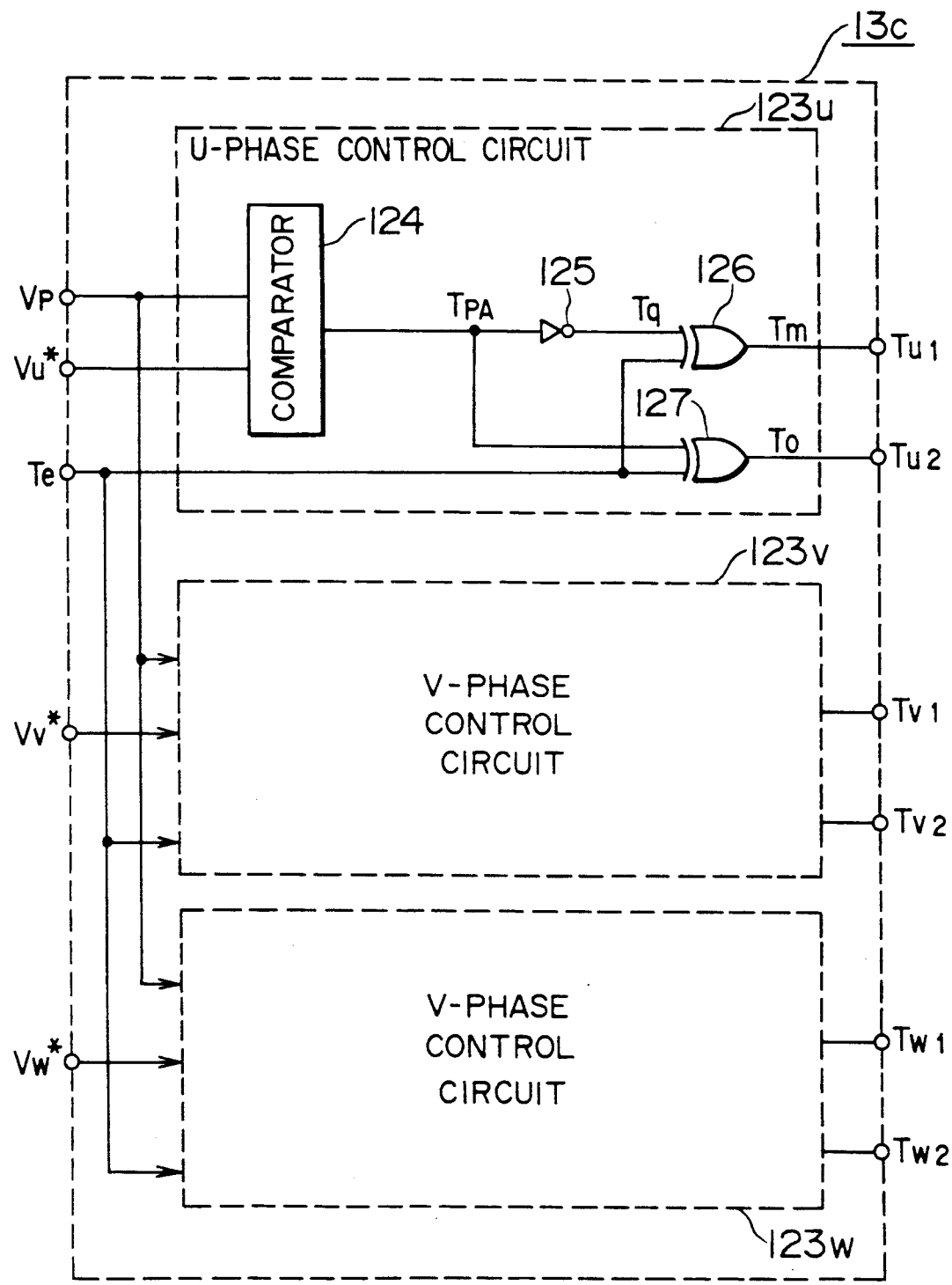
FIG. 7 is a block diagram which illustrates a cyclo converter control circuit according to the second embodiment.

FIG. 7 illustrates the detailed structure of the cyclo converter control circuit 13c. Referring to FIG. 7, reference numeral 123u represents a U-phase control circuit, 123v represents a V-phase control circuit and 123w represents a W-phase control circuit. The U-phase control circuit 123u comprises a comparator 124, a NOT circuit 125 and EX-OR (Exclusive-OR) circuits 126 and 127 so that it receives output voltage command signal $V_u^*$ transmitted from the output voltage command generating circuit 12c, the carrier signal $V_p$ and the output signal $T_e$ transmitted from the link frequency determining circuit 14 and transmits U-phase drive signal $T_{u1}$ and $T_{u2}$ of the cyclo converter circuit 4c. The structure of each of the V-phase control circuit 123v and the W-phase control circuit 123w is made to be the same as the U-phase control circuit 123u. The V-phase control circuit 123v and the W-phase control circuit 123w respectively receive the output voltage command signals $V_v^*$ and $V_w^*$ to transmit drive signals $T_{v1}$, $T_{v2}$, $T_{w1}$ and $T_{w2}$ for switching the cyclo converter circuit 4c. The drive signals $T_{un}$, $T_{vn}$, $T_{wn}$ (n=1, 2) respectively correspond to the switches $Q_{un}$, $Q_{vn}$ and $Q_{wn}$ (n=1, 2) of the cyclo converter circuit 4c.

Then, the operation of the second embodiment will now be described with reference to a timing chart shown in FIG. 8. The inverter circuit 2 performs the same operation as that according to the first embodiment to transmit the inverter output voltage $V_2$ shown in FIG. 8.

On the other hand, the cyclo converter circuit 4c shown in FIG. 6 is constituted similarly to a conventional three-phase inverter except for the fact that the cyclo converter circuit 4c has the switching devices which act in a bidirectional manner. Therefore, the cyclo converter circuit 4c is able to control the three phases individually. Therefore, the description will be made about the U-phase. First, the output voltage command generating circuit 12c transmits three-phase output voltage command signals $V_u^*$, $V_v^*$ and $V_w^*$ which are, together with the carrier signal $V_p$ and the signal $T_e$ transmitted from the link frequency determining circuit 14, then supplied to the cyclo converter control circuit 13c. The cyclo converter control circuit 13c receives the above-described signals to transmit drive signals $T_{u1}$ and $T_{u2}$ the pulse width of each of which has been modulated.

Figure 8:
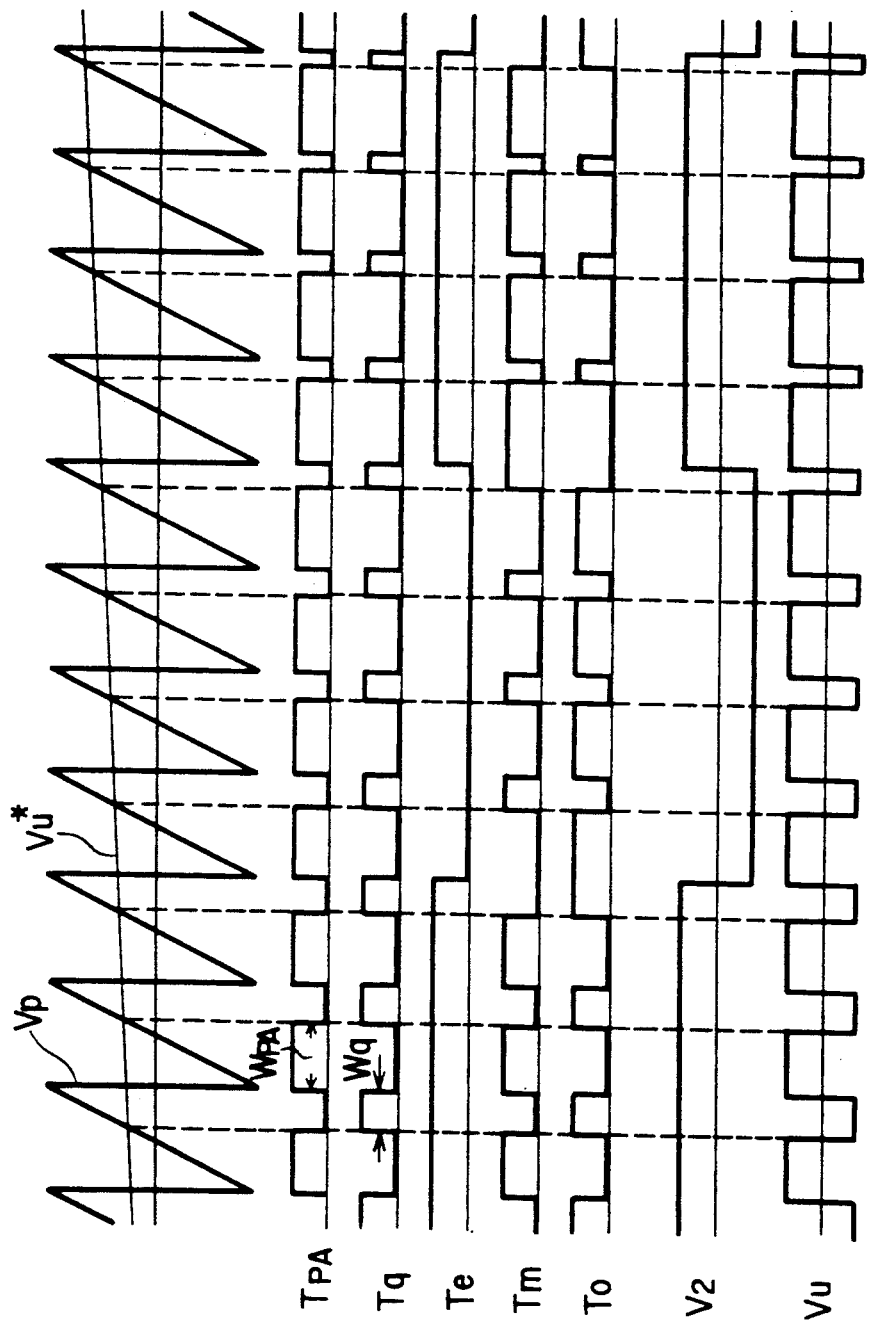
FIG. 8 is a timing chart which illustrates the operation to be performed according to the second embodiment.

First, the output voltage command signal $V_u^*$ is, together with the carrier signal $V_p$, supplied to the comparator 124 so that signal $T_{PA}$ shown in FIG. 8 is transmitted. Therefore, the pulse width $W_{PA}$ of the above-described signal $T_{PA}$ when its level is high is widened in accordance with the positive level of the output voltage command signal $V_u^*$. On the other hand, it is narrowed in inverse proportion to the negative level. Then, the signal $T_{PA}$ is supplied to the NOT circuit 125 so that inverted signal $T_q$ shown in FIG. 8 is transmitted.

Assuming that the middle point of the secondary coil of the transformer 3 is an imaginary ground O as shown in FIG. 6, the potential $V_{uo}$ of point U with respect to the above-described imaginary ground O is controlled in accordance with switching of/off operation of the switch $Q_n$ (n=1, 2) as expressed by using the secondary voltage $V_2$ of the transformer 3:

When $Q_{u1}$ is switched on: $V_{uo}=V_2/2$     (13)

When $Q_{u2}$ is switched on: $V_{uo}=-V_2/2$

Therefore, by distributing the signals $T_{PA}$ and $T_q$ to the drive signals $T_{u1}$ and $T_{u2}$ by utilizing the relationship shown in Equation (13), the U-phase voltage $V_u$ which corresponds to the U-phase output voltage command signal $V_u^*$ is obtained. Assuming that the high level pulse width of the signal $T_q$ is $W_q$, the following relationship can be obtained.

$$V_u = [(W_{PA} - W_q)/(W_{PA} + W_q)] \times V_2/2 \quad (14)$$

However, the output voltage $V_2$ from the inverter circuit 2 is a rectangular wave voltage which swings between a positive value and a negative value in accordance with the link frequency. Therefore, the following switching operation must be performed in accordance with the change in the polarity of the rectangular wave voltage:

When $V_2$ is positive, $T_{u1} = T_{PA}$, $T_{u2} = T_q$     (15)

When $V_2$ is negative, $T_{u1} = T_q$, $T_{u2} = T_{PA}$     (16)

Then, the description about the operation of the structure shown in FIG. 7 will be continued. The signal $T_e$ is a drive signal with which the above-described output voltage $V_2$ can be obtained. When the level of $V_2$ is a positive value, the level of the signal $T_e$ is high. The above-described signal $T_e$ is supplied to the EX-OR circuits 126 and 127, while the signal $T_q$ is supplied to the EX-OR circuit 126. Furthermore, the signal $T_{PA}$ is supplied to the EX-OR circuit 127. If the level of either of the two input signals is high, the EX-OR circuit transmits a polarity inverted signal of another signal. If the same is low, the EX-OR circuit transmits the polarity of the residual signal. Therefore, by assigning output signals $T_m$ and $T_o$ from the EX-OR circuits 126 and 127 to the drive signals $T_{u1}$ and $T_{u2}$, the above-described Equation (14) can be met. As a result of the above-described operation, the cyclo converter circuit 4c, as shown in FIG. 8, transmits voltage $V_u$, the waveform of which is obtained by pulse-width modulating the output voltage command signal $V_u^*$ transmitted from the output voltage command generating circuit 12 by a frequency which is four times the link frequency. Therefore, it can be understood that the wave which has been pulse-width modulated by a frequency which is n times the link frequency can be transmitted from the cyclo converter 4c by dividing the carrier signal by n in the above-described link frequency generating circuit 14.

In this state, the PWM operation can be performed similarly by a method arranged in such a manner that the output current transmitted from the cyclo converter circuit 4c is detected and the switch $Q_n$ (n=5 to 8) of the cyclo converter circuit 4c is switched in a single direction in accordance with the polarity of the output current as follows:

when the polarity of the electric current is positive:

$$S_{u1} = T_{u1}, \quad S_{u2} = T_{u2},$$

$$S_{u1A} \text{ and } S_{u2A} \text{ are switched off} \tag{17}$$

When the polarity of the electric current is negative: switches $S_{u1}$ and $S_{u2}$ are switched off $$S_{u1A} = T_{u1}, \quad S_{u2A} = T_{u2} \tag{18}$$

Furthermore, the output from the cyclo converter circuit 4c is supplied to the load circuit 6 after the high frequency component of the output voltage $V_u$ has been removed by the filter circuit 5c.

Figure 9A:
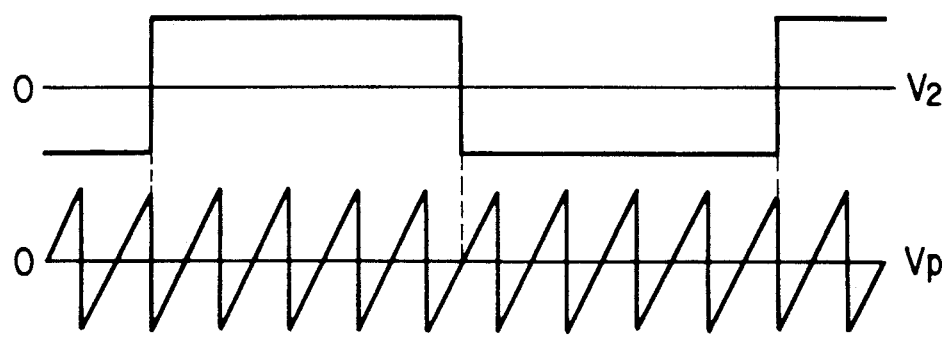
FIGS. 9A and 9B are timing charts which illustrate the operations to be performed according to another embodiments of the present invention.
Figure 9B:
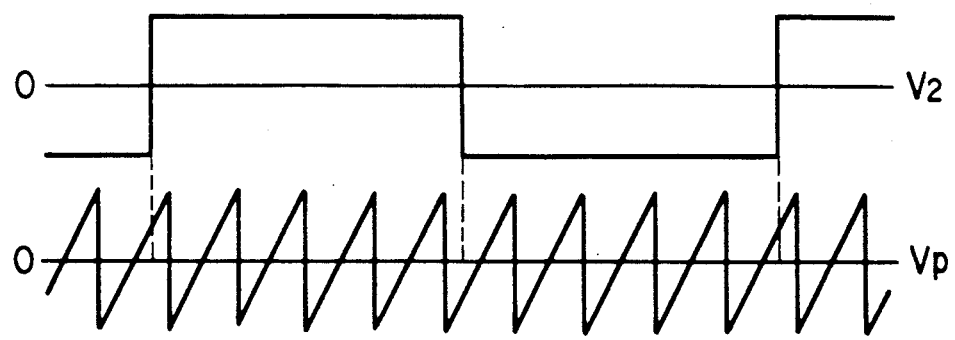

The above-described first and second embodiments are arranged in such a manner that the frequency of the inverter synchronizes with the carrier frequency of the cyclo converter while holding a relationship of even-number times. However, as shown in FIG. 9A, in a case where the above-described frequencies synchronize with each other while holding a relationship of odd-number times or, as shown in FIG. 9B, in a case where they do not synchronize with each other, the conversion apparatus arranged in accordance with the principle of the present invention can be constituted although the structure of the operation control circuit is complicated slightly.

Furthermore, the present invention is not limited to the sine wave conversion apparatus acting with a constant frequency and constant voltage such as the uninterruptive power supply apparatus. It can, of course, be applied to the achieve a variable frequency and variable voltage power source. Another application example may be an active filter which transmits an electric current in place of the voltage. In this case, it is necessary for the structure of the output voltage command generating circuit to be constituted in such a manner that it generates the output voltage command in accordance with the output current command value and the feedback value of the output current.

Although the rectangular wave inverter is employed as the first AC power source, it may be replaced by a conversion apparatus such as a cyclo converter which acts in accordance with another principle. Furthermore, a sine wave inverter may be employed as an alternative to the rectangular inverter. In a case where the sine wave power source is employed, the structure must be arranged, for example, in such a manner that a cosine comparator which is arranged to act in consideration of the waveform of the power source is used in the control circuit. Therefore, the conversion apparatus acting in accordance with the principle of the present invention can, of course, be constituted, although the structure is complicated slightly.

What is claimed is:

1. A power conversion apparatus comprising:
   a reference signal generating circuit for generating a reference signal which has a first frequency;
   a first power converter for converting D.C. power into A.C. power which has the first frequency;
   a transformer connected to said first power converter;
   a carrier signal generating circuit for generating a carrier signal which has a second frequency which is related to the first frequency by a factor of n, where n is greater than 2;
   a second power converter having a plurality of switching means and converting the output from said transformer into A.C. power, an output signal from the second power converter having the second frequency;
   a command signal generating circuit for generating a command signal for commanding the quantity of the output from said second power converter; and
   a second power converter control circuit for generating a drive signal for driving a plurality of the switching means of said second power converter in such a manner that the drive signal is generated in response to the reference signal generated by said reference signal generating circuit and the command signal generated by said command signal generating circuit and in synchronization with the carrier signal generated by said carrier signal generating circuit.

2. A power conversion apparatus according to claim 1 wherein n is equal to 4.

3. A power conversion apparatus according to claim 1 further comprising a first-power-converter control circuit for generating, in synchronization with the reference signal generated by said reference signal generating circuit, a signal for controlling said first power converter.

4. A power conversion apparatus according to claim 1 wherein said second power converter has a plurality of bidirectional switches each of which is composed of a pair of switches in which power is supplied in opposite directions.

5. A power conversion apparatus according to claim 4 wherein said second-power-converter control circuit transmits drive signals which correspond to switches of the switching means of said second power converter, said drive signals being signals the pulse width of each of which has been modulated.

6. A power conversion apparatus according to claim 1 further comprising a filter circuit for removing the high frequency component included in the output from said second power converter.

7. A power conversion apparatus according to claim 1 wherein said first power converter transmits A.C. power the duty ratio of which is 50%.

8. A power conversion apparatus according to claim 1 wherein said second power converter transmits three-phase A.C. power.

9. A power conversion apparatus comprising:
   a reference signal generating circuit for generating a reference signal having a link frequency;
   a first power converter for converting D.C. power into a first A.C. signal having the link frequency;
   a transformer connected to the first power converter for receiving the first A.C. signal and outputting a second A.C. signal having the link frequency;
   a carrier signal generating circuit for generating a carrier signal having a pulse width modulated frequency being a multiple of the link frequency, wherein the multiple is greater than two;
   a second power converter having a plurality of switching means and receiving the second A.C. signal, the second power converter converting the second A.C. signal into a pulse width modulated signal having the pulse width modulated frequency.

10. A power conversion apparatus as recited in claim 9 including a filter circuit, coupled to the second power converter, for removing high frequency components from the pulse width modulated signal and for converting the pulse width modulated signal into an output AC signal having a output frequency which is at least ten times smaller than the link frequency.

11. A power conversion apparatus as recited in claim 9 wherein the multiple is at least four.

* * * * *